US009654654B1

(12) United States Patent
Jing et al.

(10) Patent No.: US 9,654,654 B1
(45) Date of Patent: *May 16, 2017

(54) INTERFACE TO FACILITATE BROWSING OF ITEMS OF VISUAL CONTENT

(71) Applicant: Google Inc., Mountain View, CA (US)

(72) Inventors: Yushi Jing, San Francisco, CA (US); Wei Cai, Atlanta, GA (US)

(73) Assignee: Google Inc., Mountain View, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/703,424

(22) Filed: May 4, 2015

Related U.S. Application Data

(63) Continuation of application No. 13/399,652, filed on Feb. 17, 2012, now Pat. No. 9,025,888.

(51) Int. Cl.
| | |
|---|---|
| *H04N 1/00* | (2006.01) |
| *G06K 9/00* | (2006.01) |
| *G06F 17/30* | (2006.01) |
| *G06K 9/62* | (2006.01) |
| *G06F 3/0481* | (2013.01) |
| *G06F 3/0484* | (2013.01) |

(52) U.S. Cl.
CPC ..... *H04N 1/00442* (2013.01); *G06F 3/04815* (2013.01); *G06F 3/04845* (2013.01); *G06F 17/30061* (2013.01); *G06F 17/30256* (2013.01); *G06F 17/30994* (2013.01); *G06K 9/00496* (2013.01); *G06K 9/6218* (2013.01); *H04N 2201/0089* (2013.01)

(58) Field of Classification Search
None
See application file for complete search history.

(56) References Cited

U.S. PATENT DOCUMENTS

| | | |
|---|---|---|
| 6,466,237 B1 | 10/2002 | Miyao et al. |
| 8,046,714 B2 | 10/2011 | Yahiro et al. |

(Continued)

OTHER PUBLICATIONS

Daniela Petrelli et al., "Concept Hierarchy Across Languages in Text-Based Image Retrieval: A User Evaluation", Working Notes of the CLEF Workshop, Vienna, Austria, Sep. 21-23, 2005, 10 pages, http://clef.isti.cnr.it/2005/working_notes/workingnotes2005/petrelli05.pdf.

(Continued)

*Primary Examiner* — Kim Vu
*Assistant Examiner* — Nathan Bloom
(74) *Attorney, Agent, or Firm* — Dority & Manning, P.A.

(57) ABSTRACT

A server is configured to identify items of visual content; assign the identified items to clusters; assign the identified items, of a particular cluster, to layers; generate a document that includes information regarding the identified items arranged according to the clusters and the layers; and provide the document. The document may include, for the particular cluster, a first item, corresponding to one of the identified items assigned to a first layer, and second items, corresponding to multiple ones of the identified items assigned to a second layer. The size of the first item may be greater than a size of each of the second items. The first item may be presented on top of the second items, within the document, to at least partially cover the second items, where at least one of the second items is at least partially visible within the document.

20 Claims, 17 Drawing Sheets

(56) References Cited

U.S. PATENT DOCUMENTS

| | | | |
|---|---|---|---|
| 8,352,465 B1* | 1/2013 | Jing | G06F 17/30867 707/723 |
| 8,438,163 B1* | 5/2013 | Li et al. | 707/737 |
| 9,025,888 B1 | 5/2015 | Jing et al. | |
| 2005/0289452 A1 | 12/2005 | Kashi et al. | |
| 2006/0236251 A1 | 10/2006 | Kataoka et al. | |
| 2007/0226255 A1* | 9/2007 | Anderson | G06F 17/30265 |
| 2008/0147664 A1 | 6/2008 | Fujiwara et al. | |
| 2008/0307345 A1 | 12/2008 | Hart et al. | |
| 2009/0278916 A1 | 11/2009 | Ito | |
| 2009/0282003 A1 | 11/2009 | Hirata | |
| 2010/0107062 A1 | 4/2010 | Bacus et al. | |
| 2010/0146450 A1 | 6/2010 | Harada | |
| 2010/0223276 A1* | 9/2010 | Al-Shameri et al. | 707/769 |
| 2011/0286647 A1* | 11/2011 | Cao | G06F 3/04815 382/131 |
| 2013/0141456 A1* | 6/2013 | Sokolov et al. | 345/620 |
| 2013/0166587 A1 | 6/2013 | Berry | |

OTHER PUBLICATIONS

Yushi Jing et al., "Google Image Swirl: A Large-Scale Content-Based Image Browsing System":, 1 page, Oct. 23, 2011 (print date).
Google Image Swirl, Part 1, "What is Google Image Swirl and How it Works?", 3 pages, Oct. 23, 2011 (print date).
Google Image Swirl, Part 2, "What is Google Image Swirl and How it Works?", 3 pages, Oct. 23, 2011 (print date).
Google Image Swirl, Part 3, "Step by Step Guide on How to Use Google Image Swirl", 3 pages, Oct. 23, 2011 (print date).
Google Image Swirl, Part 4, "Google Image Swirl an Advanced Search Engine for Images", 2 pages, Oct. 23, 2011 (print date).
Google Image Swirl, Part 5, "Get Relevant Images With Google Image Swirl", 2 pages, Oct. 23, 2011 (print date).
Google Image Swirl, Part 6, "Why You Must Use Google Image Swirl", 3 pages, Oct. 23, 2011 (print date).
Google Image Swirl, Part 7, "Google Image Swirl Video", 2 pages, Oct. 23, 2011 (print date).
Ka-Ping Yee et al., "Faceted Metadata for Image Search and Browsing", 8 pages, Apr. 2003.
Deng Cai et al., "Hierarchical Clustering of WWW Image Search Results Using Visual, Textual and Link Information", pp. 952-959, Oct. 2004.
Google Image Swirl Beta, "Internet Widgets", 2 pages, Nov. 18, 2009.
Jau-Yuen Chen et al., "Similarity Pyramids for Browsing and Organization of Large Image Databases", pp. 1-13, Jan. 1998.
Google Image Swirl, Wikipedia, 2 pages, Oct. 21, 2011 (print date).
Shuo Wang et al., "IGroup: Presenting Web Images Search Results in Semantic Clusters", pp. 1-10, Apr. 2007.
Benjamin B. Bederson et al., "Pad++: A Zooming Graphical Sketchpad for Exploring Alternate Interface Physics", *Journal of Visual Languages and Computing*, pp. 1-30, Sep. 1995.
Copending U.S. Appl. No. 13/233,293, entitled "Grouping and Presenting Images," to Yushi Jing et al., filed Sep. 15, 2011, 49 pages.

* cited by examiner

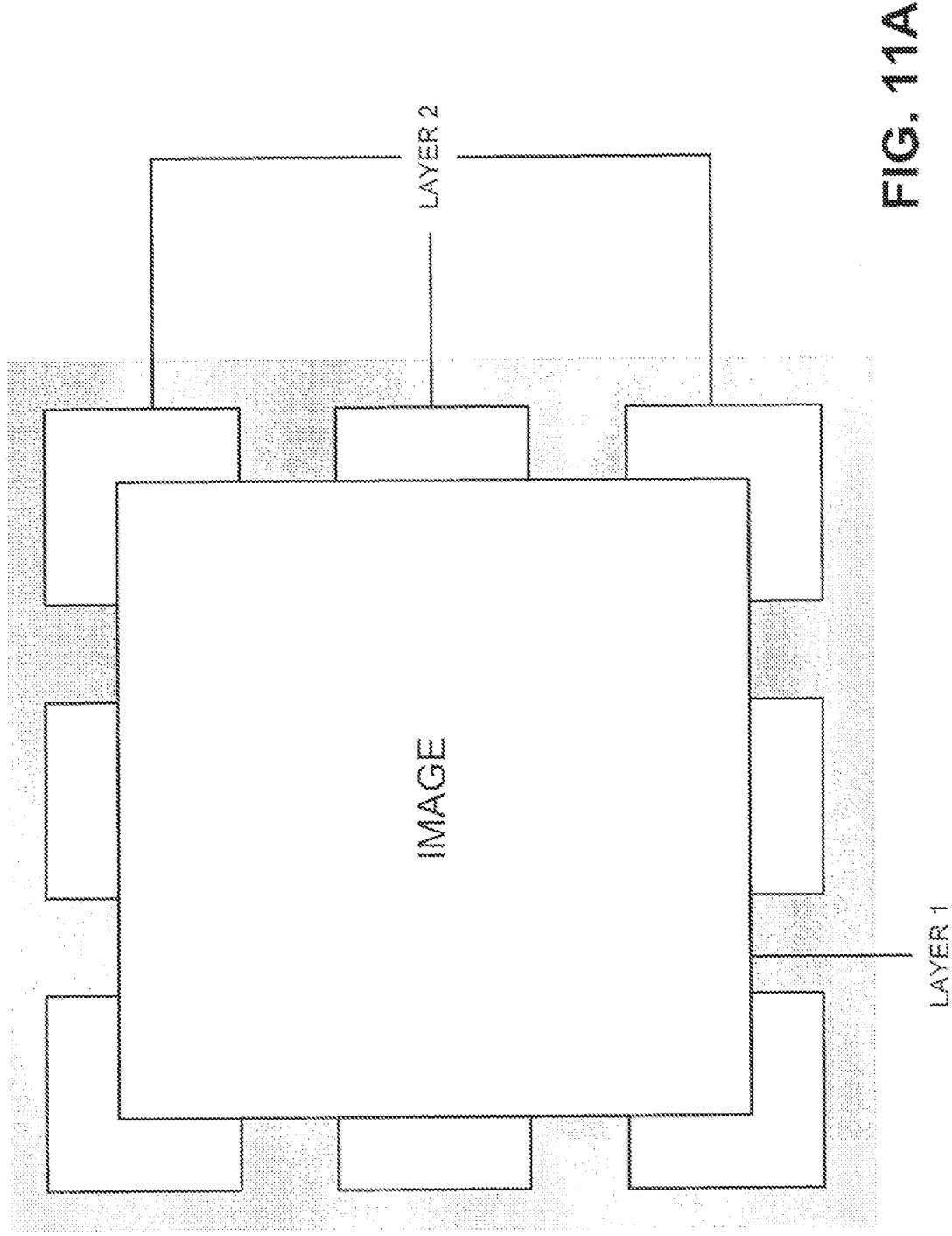

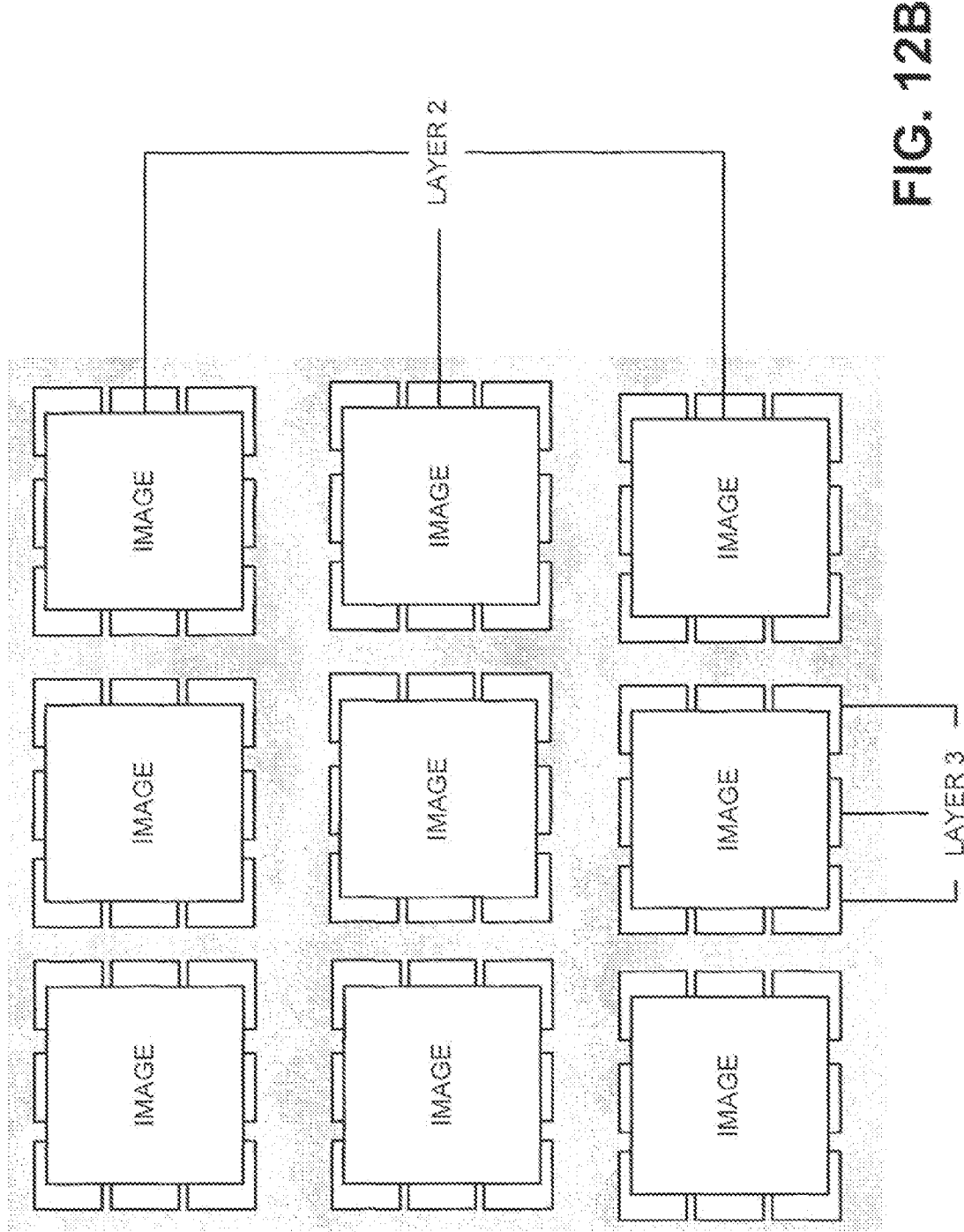

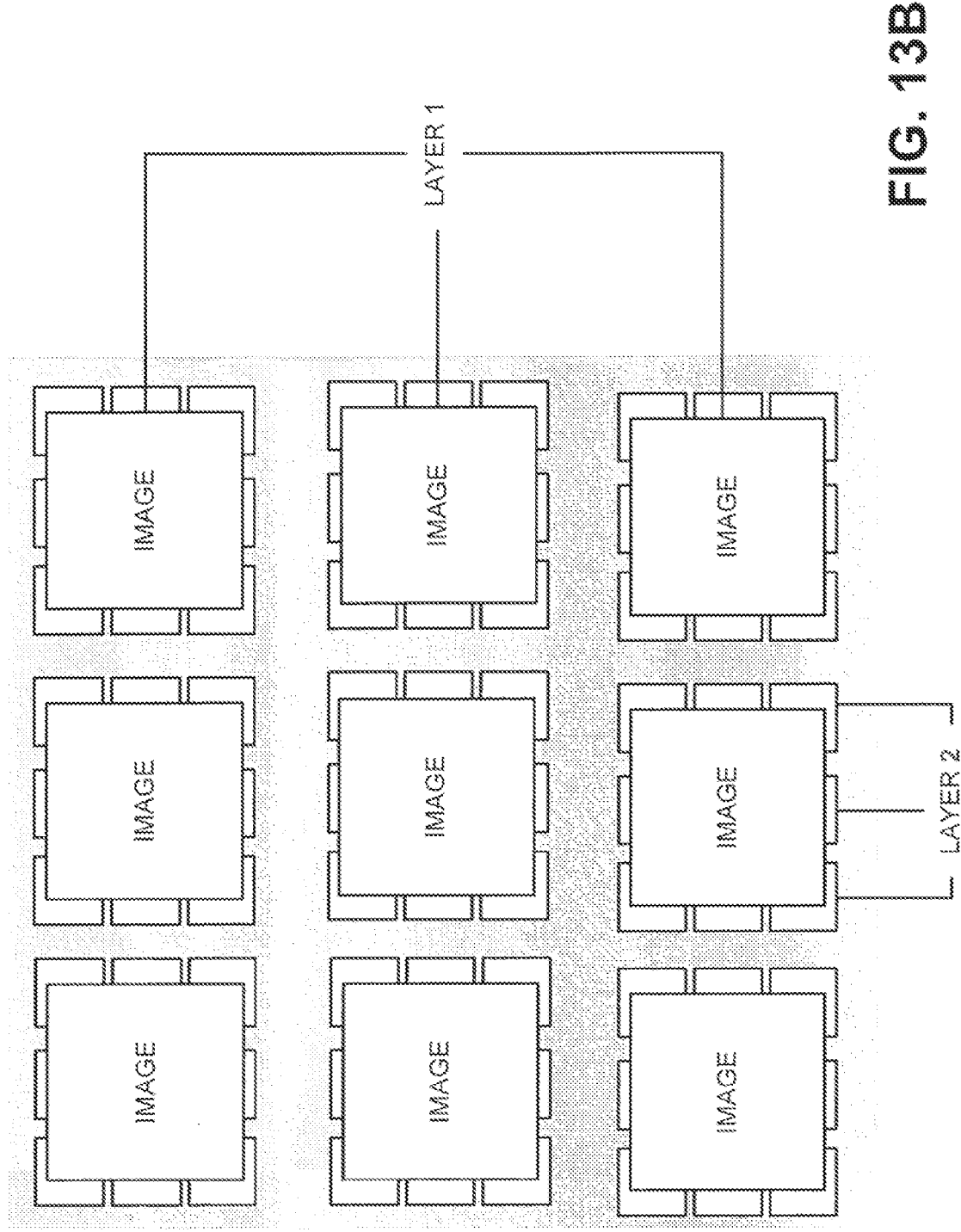

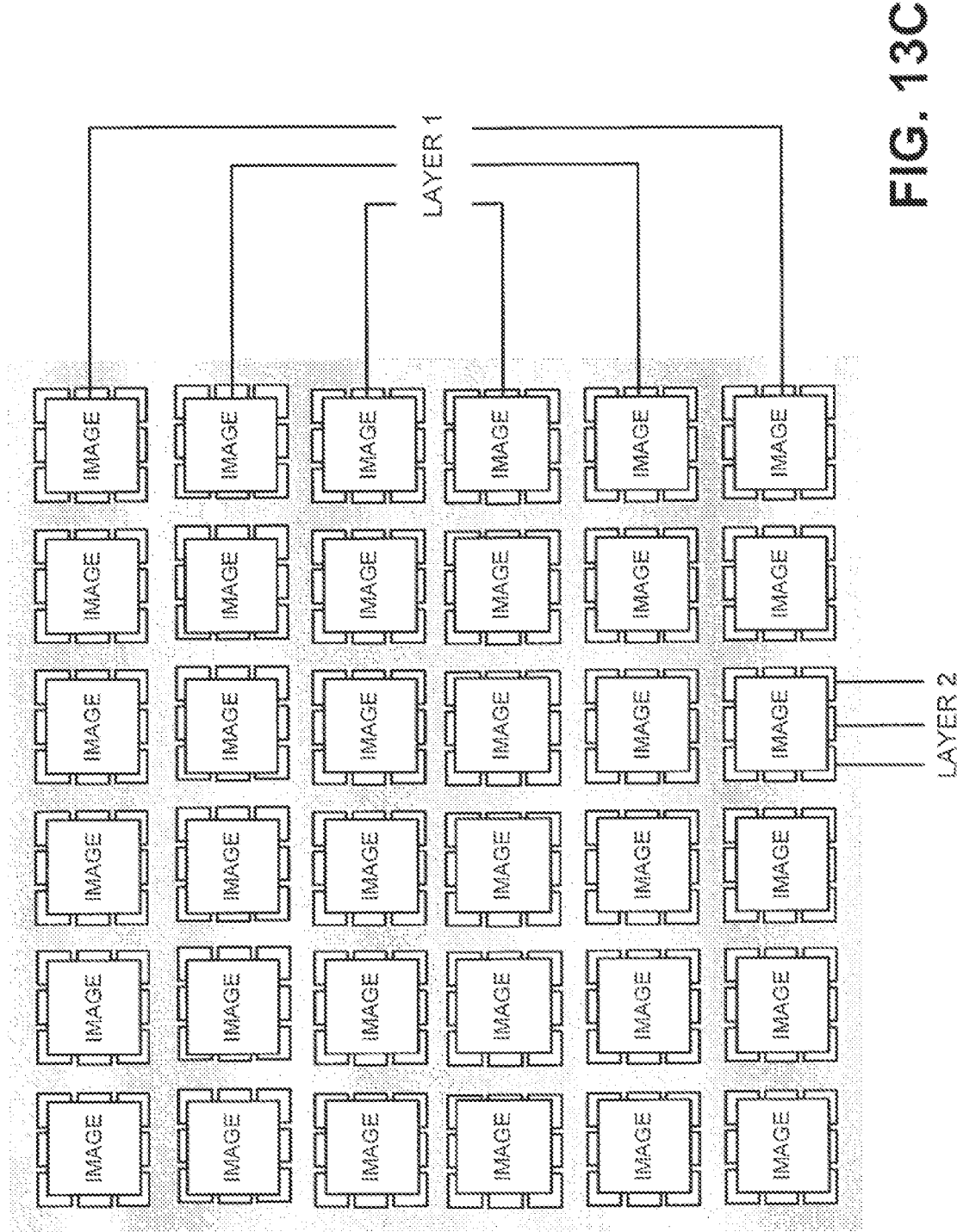

INTERFACE TO FACILITATE BROWSING OF ITEMS OF VISUAL CONTENT

RELATED APPLICATIONS

This application is a continuation of U.S. patent application Ser. No. 13/399,652, filed Feb. 17, 2012 (now U.S. Pat. No. 9,025,888). The disclosure of which is incorporated herein by reference.

BACKGROUND

Many techniques are available to users today to find information on the World Wide Web ("web"). For example, users often use web browsers and/or search engines to find information of interest.

One particular type of information commonly sought by users includes visual information, such as images. Some existing image search engines present search results as a ranked list of images. The ranked list may be presented as a vertical list of images or as a horizontal list of images, where the images wrap from one row to the next.

SUMMARY

According to some possible implementations, a method, performed by one or more computer devices, may include identifying images; assigning the identified images to clusters, where a group of the identified images is assigned to one of the clusters; assigning the group of the identified images, assigned to the one of the clusters, to layers; generating a document that includes information regarding the identified images arranged according to the clusters and the layers; and providing the document for presentation on a display associated with a client device. The document may include, for one of the clusters, a first image, corresponding to one of the identified images assigned to a first one of the layers, and second images, corresponding to multiple ones of the identified images assigned to a second one of the layers, where a size of the first image may be greater than a size of each of the second images. The first image may be presented on top of the second images, within the document, to at least partially cover the second images, and where at least one of the second images may be at least partially visible within the document.

According to some possible implementations, a system may include one or more computer devices to identify items of visual content; assign the identified items of visual content to clusters, where a group of the identified items of visual content is assigned to one of the clusters; assign the group of the identified items of visual content, assigned to the one of the clusters, to layers; generate a document that includes information regarding the identified items of visual content arranged according to the clusters and the layers; and provide the document for presentation on a display associated with a client device. The document may include, for the one of the clusters, a first item of visual content, corresponding to one of the identified items of visual content assigned to a first one of the layers, and second items of visual content, corresponding to multiple ones of the identified items of visual content assigned to a second one of the layers. The size of the first item of visual content may be greater than a size of each of the second items of visual content. The first item of visual content may be presented on top of the second items of visual content, within the document, to at least partially cover the second items of visual content, where at least one of the second items of visual content may be at least partially visible within the document.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 11A and 11B are diagrams illustrating an example of transitioning from one layer of images to another layer of images;

FIGS. 12A and 12B are diagrams illustrating another example of transitioning from one layer of images to another layer of images; and FIGS. 13A-13C are diagrams illustrating potential zoom operations that may be performed.

DETAILED DESCRIPTION

The following detailed description refers to the accompanying drawings. The same reference numbers in different drawings may identify the same or similar elements.

A system and/or method, as described herein, may organize items of visual content, such as images or videos, into clusters and layers of related items of visual content, and permit users to interact with, or otherwise browse the clusters and layers of items of visual content, to locate images of interest. The organization of items of visual content into clusters and layers may show the relationship between items of visual content and permit a user to locate an item of interest in an expedited manner over a simple ranked list of such items of visual content.

Figure 1:
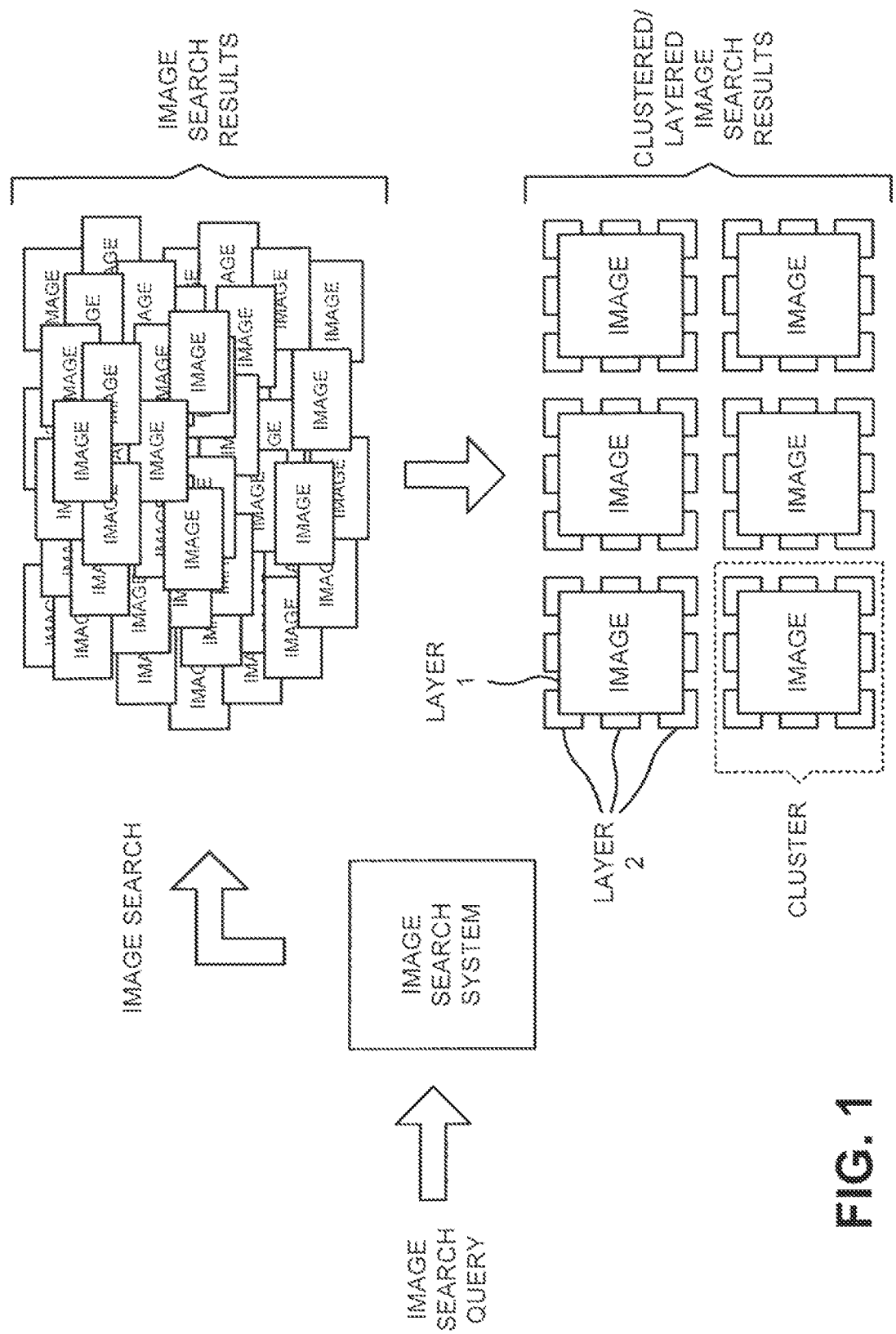
FIG. 1 is a diagram illustrating an overview of an example implementation described herein.

FIG. 1 is a diagram illustrating an overview of an example implementation described herein. Assume, for the example implementation described with respect to FIG. 1, that an image search query is submitted to an image search system. The image search query may take the form of one or more search terms. Alternatively, or additionally, the image search query may take the form of an input image, such as an image file or an address of an image on a network, that represents an example image for which additional images, like the example image, are sought.

The image search system may perform a search, based on the image search query, to identify a set of image search results. The image search results may correspond to images that are deemed relevant to the image search query. The image search system may group the image search results into clusters based on features that the image search results have in common. These features may include, for example, color, shape, size, content, facial signatures, and/or metadata, such as labels or tags associated with the images.

The image search system may organize the image search results into clusters and layers to assist the user in finding an image of interest. As shown in FIG. 1, a cluster may include a representative image, e.g., labeled as "IMAGE," presented in a layer on top of a set of other images in the cluster. The size of the representative image may be larger than the sizes of the other images in the cluster. This may assist the user in identifying a cluster that is most likely to contain the image of interest. The user may then browse the images by moving to another layer, by zooming in or out, and/or by panning to locate the image of interest. The browsing is intuitive in the sense that the user may identify images associated with a subsequent layer before transitioning to the subsequent layer.

While the description to follow will focus on presenting and browsing image search results, this description is not limited to just image search results. For example, the description may apply to presenting and browsing images that have not been identified as a result of a search, such as any repository of images. One example of a repository of images may include images that are stored on a user's local computer. Another example of a repository of images may include images stored on a server computer, such as a server computer associated with an online image service. Accordingly, the term "search result" may be used as synonymous to the term "image."

Also, while the description to follow will focus on presenting and browsing images, this description is not limited to just images. For example, the description may apply to presenting and browsing other types of visual content, such as videos or scanned documents—e.g., books, magazines, or the like. A document, as the term is used herein, is to be broadly interpreted to include any machine-readable and machine-storable work product. A document may include, for example, an e-mail, a web site, a file, a combination of files, one or more files with embedded links to other files, a news article, a blog, a discussion group posting, etc. In the context of the Internet, a common document is a web page. Web pages often include textual information and may include embedded information, such as meta information, images, hyperlinks, etc., and/or embedded instructions, such as Javascript. A link, as the term is used herein, is to be broadly interpreted to include any reference to a document from another document or another part of the same document.

Figure 2:
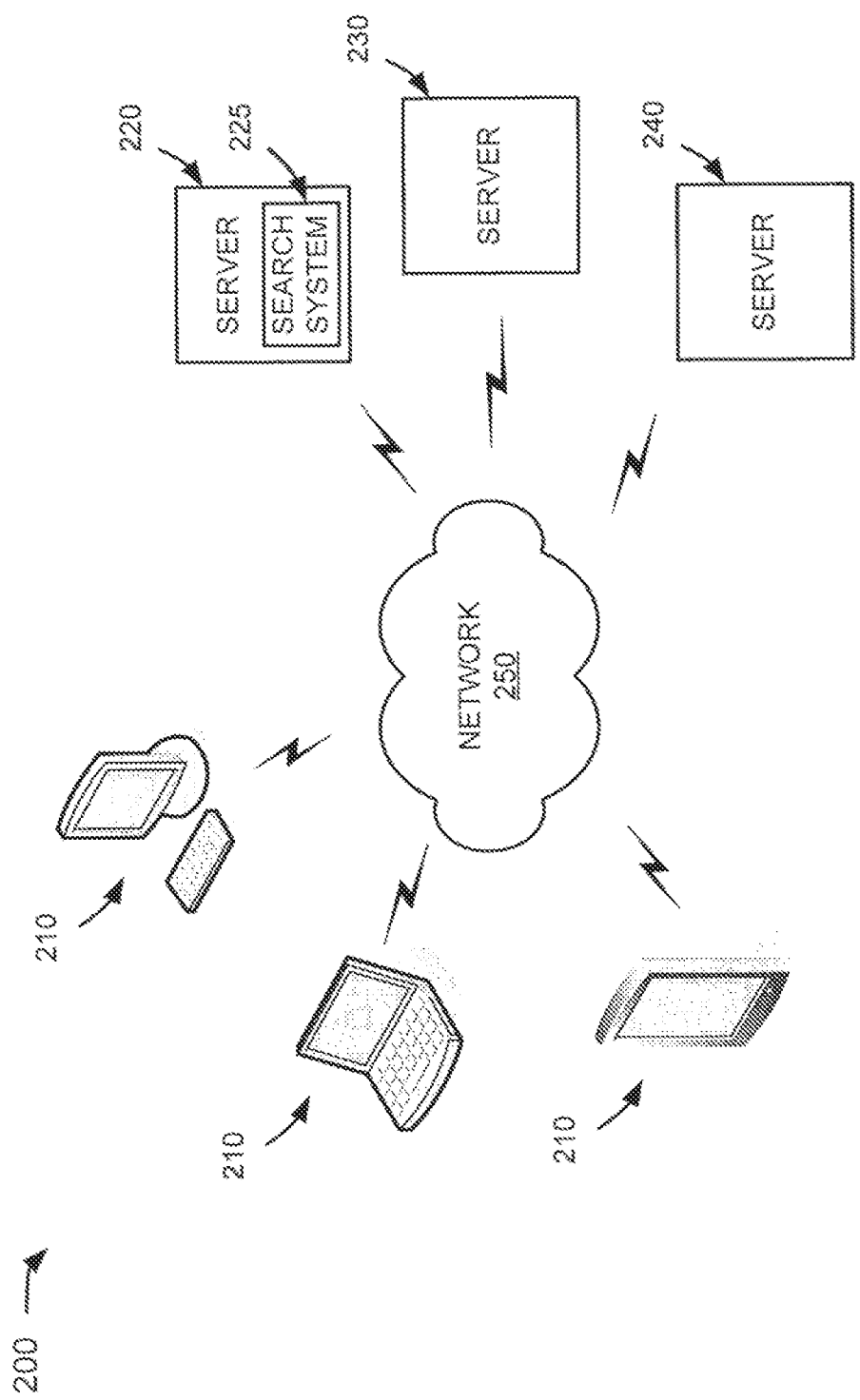
FIG. 2 is a diagram of an example environment in which systems and/or methods described herein may be implemented.

FIG. 2 is a diagram of an example environment 200 in which systems and/or methods described herein may be implemented. Environment 200 may include multiple clients 210 connected to multiple servers 220-240 via a network 250. Three clients 210 and three servers 220-240 have been illustrated as connected to network 250 for simplicity. In practice, there may be additional or fewer clients and servers. Also, in some instances, a client may perform a function of a server, and a server may perform a function of a client.

Each of clients 210 may include a client device, such as personal computer, a wireless telephone, a personal digital assistant ("PDA"), a laptop, a tablet computer, or another type of computation or communication device. Clients 210 may include user interfaces presented through one or more browsers—e.g., web browsers.

Servers 220-240 may include server devices that gather, process, search, and/or implement functions in a manner described herein. Each server 220-240 may be implemented as a single server device or a collection of server devices that may be co-located or remotely located. Additionally, or alternatively, any two or more of servers 220-240 may be implemented within a single, common server device or a single, common collection of server devices. While servers 220-240 are shown as separate components, it may be possible for one or more of servers 220-240 to perform one or more of the functions of another one or more of servers 220-240.

As shown in FIG. 2, server 220 may implement a search system 225 that receives search queries from clients 210, and that provides search results that are responsive to the search queries. Server 220 may crawl a corpus of documents, e.g., web documents, index the documents, and store information associated with the documents in a repository of documents. Servers 230 and 240 may store or maintain documents that may be crawled or analyzed by server 220.

Network 250 may include any type of network, such as a local area network ("LAN"), a wide area network ("WAN"), a telephone network, such as the Public Switched Telephone Network ("PSTN") or a cellular network, an intranet, the Internet, or a combination of networks. Clients 210 and servers 220-240 may connect to network 250 via wired and/or wireless connections. In other words, any one of clients 210 and servers 220-240 may connect to network 250 via a wired connection, a wireless connection, or a combination of a wired connection and a wireless connection.

Figure 3:
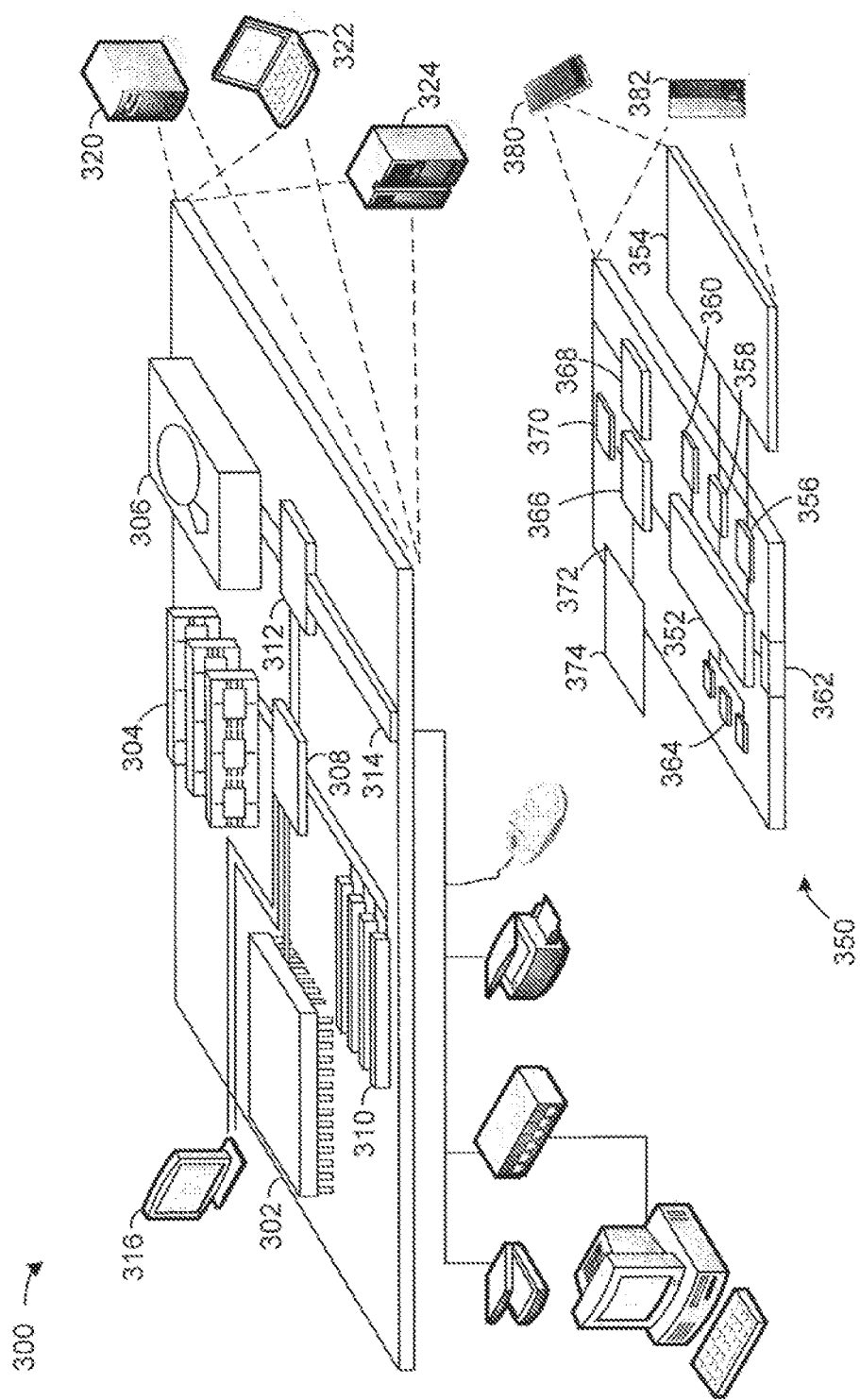
FIG. 3 shows an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described herein.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In some implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within the computing device 300. In some implementations, memory 304 includes a volatile memory unit or units. In some implementations, memory 304 includes a non-volatile memory unit or units. The memory 304 may also be another form of computer-readable medium, such as a magnetic or optical disk. A computer-readable medium may refer to a non-transitory memory device. A memory device may refer to storage space within a single storage device or spread across multiple storage devices.

The storage device 306 is capable of providing mass storage for the computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is an example only. In some implementations, high-speed controller 308 is coupled to memory 304, display 316—e.g., through a graphics processor or accelerator, and to high-speed expansion ports 310, which may accept various expansion cards. In these implementations, low-speed controller 312 is coupled to storage device 306 and low-speed expansion port 314. The low-speed expansion port, which may include various communication ports—e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display ("TFT LCD") or an Organic Light Emitting Diode ("OLED") display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication, and/or for wireless communication, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module ("SIMM") card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, Global Positioning System ("GPS") receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs—also known as programs, software, software applications or code—include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

Figure 4:
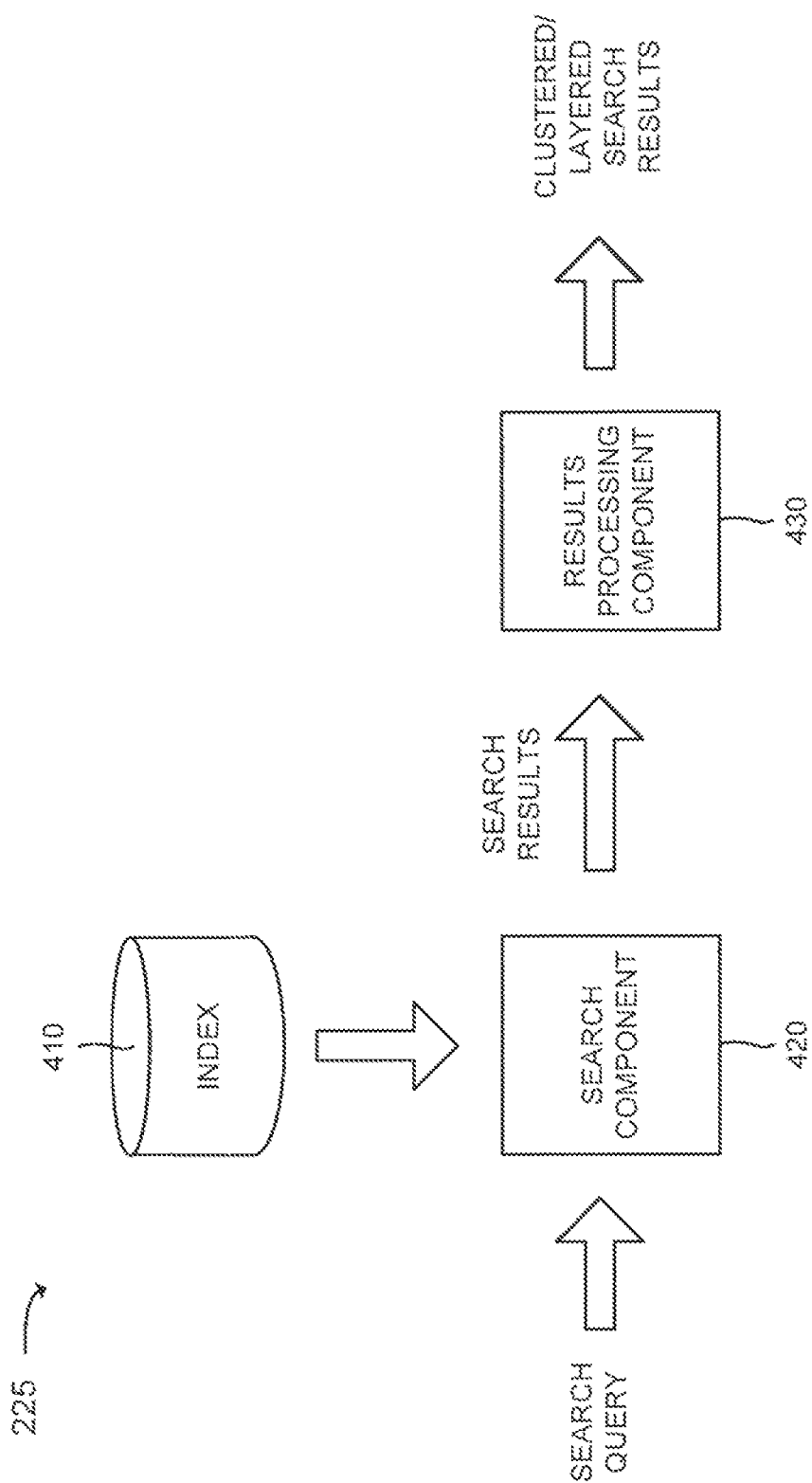
FIG. 4 is a diagram of example functional components of a search system of FIG. 2.

FIG. 4 is a diagram of example functional components of search system 225. Each of the functional blocks, shown in FIG. 4, may be implemented by one or more of the components described with regard to FIG. 3. As shown in FIG. 4, search system 225 may include an index 410, a search component 420, and a results processing component 430. In some implementations, search system 225 may include additional or fewer components than are illustrated in FIG. 4.

Index 410 may represent one or more indexes that may be stored in one or more memory devices, which may be co-located or remotely located. Index 410 may store information regarding images. In some implementations, each entry in index 410 may store information identifying an address, such as a uniform resource locator ("URL") or uniform resource identifier ("URI"), associated with an image, and/or metadata associated with the image, such as tags, labels, and/or other forms of text descriptive of the image. In some implementations, an entry in index 410 may store additional information for an image, such as a link to the image. The information in the entry may be used by search component 420 to identify whether the image is relevant to a search query.

Search component 420 may receive a search query and perform a search of index 410 based on the search query. When index 410 corresponds to a single index, search component 420 may perform a search of the single index to identify images, as search results that are relevant to the search query. When index 410 corresponds to multiple indexes, search component 420 may perform a search, possibly in parallel, of the multiple indexes to identify images, in each of the indexes, as search results that are relevant to the search query. Additionally, or alternatively, search component 420 may receive search results, relevant to the search query, from one or more other search systems.

Search component 420 may generate scores for the search results. As described above, each search result may correspond to an image that has been identified as relevant to the search query. In some implementations, the score, for a search result, may reflect a measure of relevance of the corresponding image to the search query. When the search query is in the form of one or more search terms, the score may reflect the measure of relevance of the corresponding image to the one or more search terms. When the search query is in the form of an example image, the score may reflect the measure of relevance of the corresponding image to the example image.

In some implementations, the score, for a search result, may reflect a measure of quality of the corresponding image. In these implementations, the search query may be used to identify a relevant image, which is scored based on the image's measure of quality. Several techniques exist for measuring the quality of an image, such as a technique based on the source of the image, a technique based on an age of the image, a technique based on user accesses of the image, a technique based on a content of the image which may demote images that may be deemed offensive, etc.

In some implementations, the score, for a search result, may reflect a combination of a measure of relevance of the corresponding image to a search query and a measure of quality of the corresponding image. In some implementations, the score, for a search result, may reflect a weighted combination of a measure of relevance of the corresponding image to a search query and a measure of quality of the corresponding image, where the measure of relevance may be weighted differently from the measure of quality. In some implementations, the score, for a search result, may be determined in another manner.

Search component 420 may rank the search results based on the scores. For example, search component 420 may create a list of search results and sort the search results, in the list, based on the scores of the search results. In some possible implementations, search component 420 may combine search results obtained from multiple indexes and/or multiple sources. Search component 420 may provide the list of search results to results processing component 430.

Results processing component 430 may assign search results to clusters and organize the clusters into layers, as will be described in more detail below. Results processing component 430 may generate scores for the clusters and assign search results, of a cluster, to different layers. Results processing component 430 may determine the manner in which to present the search results, in relation to the clusters, based on the scores for the clusters. Results processing component 430 may output the search results arranged by the clusters and layers to which the search results are assigned.

Figure 5:
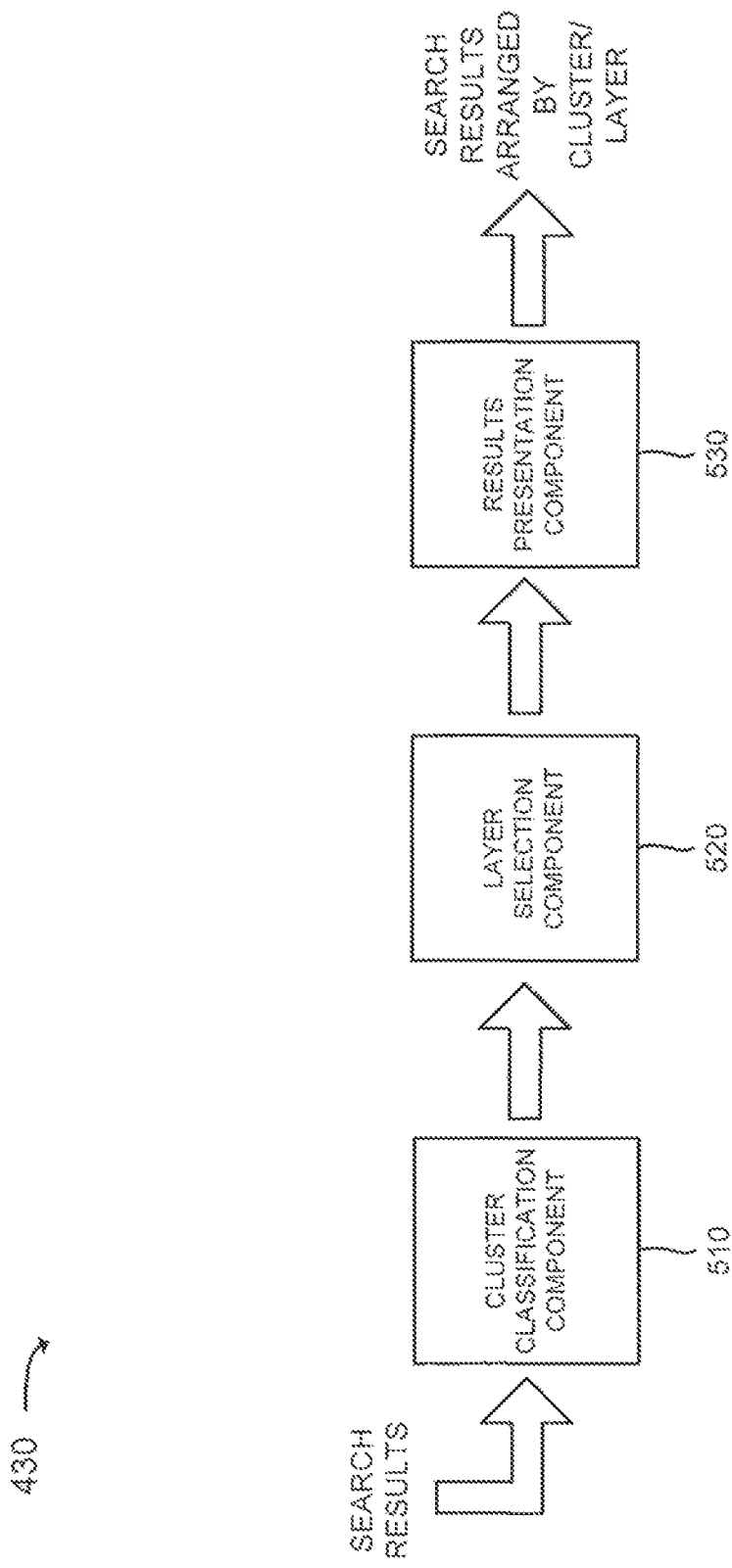
FIG. 5 is a diagram of example functional components of a results processing component of FIG. 4.

FIG. 5 is a diagram of example functional components of results processing component 430. Each of the functional blocks, shown in FIG. 5, may be implemented by one or more of the components described with regard to FIG. 3. As shown in FIG. 5, results processing component 430 may include a cluster classification component 510, a layer selection component 520, and a results presentation component 530. In some implementations, results processing component 430 may include additional or fewer components than are illustrated in FIG. 5.

Cluster classification component 510 may receive the search results and may assign images, corresponding to the search results, to clusters. In some implementations, cluster classification component 510 may assign images to clusters using features of the images, such as color, shape, size, content, facial signatures, and/or metadata, such as labels or tags associated with the images. Cluster classification component 510 may use a single image feature or a combination of image features to assign images to clusters.

With regard to color, cluster classification component 510 may assign images, which have the same or similar colors, to the same cluster. For example, cluster classification component 510 may assign images, which have the color red, to one cluster; images, which have the color green, to another cluster; etc. In some example implementations, cluster classification component 510 may consider the predominant color, or colors, in the images to determine how to assign the images to clusters. In some example implementations, cluster classification component 510 may consider colors, other than the predominant color(s) in the images, to determine how to assign the images to clusters.

With regard to shape, cluster classification component 510 may assign images, which have the same or similar aspect ratios, to the same cluster. For example, cluster classification component 510 may assign images with aspect ratios in a particular range of aspect ratios, to one cluster; images with aspect ratios in another range of aspect ratios, to another cluster, etc. In some implementations, cluster classification component 510 may use a shape-related factor, other than aspect ratio, to assign images to clusters.

With regard to size, cluster classification component 510 may assign images, which have similar sizes, to the same cluster. For example, cluster classification component 510 may assign images with sizes in a particular range of sizes, to one cluster; images with sizes in another range of sizes, to another cluster, etc. The size of an image may be measured in terms of a quantity of pixel in the image, the resolution of the image, or some other measure of image size.

With regard to content, cluster classification component 510 may assign images, which depict the same or a similar object, to the same cluster. For example, if the images include depictions of trees and houses, classification component 510 may assign the tree images to the same cluster, and assign the house images to another cluster. In some example implementations, cluster classification component 510 may consider the predominant object, or objects, in the images to determine how to assign the images to clusters. In some example implementations, cluster classification component 510 may consider objects, other than the predominant object(s) in the images, to determine how to assign the images to clusters.

With regard to facial signatures, cluster classification component 510 may assign images, which depict faces with similar facial features, to the same cluster. For example, cluster classification component 510 may consider various facial features, such as size, shape, color, placement of eyes, ears, nose, mouth, etc., or the like, of the depicted faces to determine how to assign the images to clusters. With regard to metadata, cluster classification component 510 may assign images, with similar tags, labels, etc., to the same cluster. To determine whether two tags or labels are similar, cluster classification component 510 may use any text analysis technique that is capable of identifying text matches, synonyms, stems, etc.

In addition to image features, or instead of image features, cluster classification component 510 may assign images to clusters using some other information, such as information regarding a source of the images, information regarding a date of the images, information regarding a time of day depicted in the images, information regarding sizes of objects in the images, or the like. Cluster classification component 510 may use any of this information, alone or in combination, to assign images to clusters. Additionally, cluster classification component 510 may use this information in combination with one or more of the image features identified above to assign images to clusters.

With regard to source, cluster classification component 510 may assign images, which are associated with the same source, to the same cluster. For example, cluster classification component 510 may assign images, which are associated with the same web page, web site, domain, server, etc., to the same cluster.

With regard to date, cluster classification component 510 may assign images, which have the same or similar dates, to the same cluster. For example, cluster classification component 510 may assign images, with dates in a particular range of dates, to one cluster; images, with dates in another range of dates, to another cluster, etc. With regard to time of day, cluster classification component 510 may assign images to clusters based on a time of day depicted in the images. For example, cluster classification component 510 may assign images, which depict daytime, to one cluster; images, which depict nighttime, to another cluster, etc.

With regard to sizes of objects, cluster classification component 510 may assign images, which depict the same or a similar object of a similar size, to the same cluster. For example, if the images include depictions of trees, classification component 510 may assign the images, which depict trees of a size in a particular range of sizes, to one cluster; images, which depict trees of a size in another range of sizes, to another cluster, etc.

In some possible implementations, cluster classification component 510 may create a particular quantity of clusters, such as nine, sixteen, or twenty five clusters. In some possible implementations, cluster classification component 510 may create a quantity of clusters that is dependent upon the quantity of images identified as search results. For example, cluster classification component 510 may create a first quantity of clusters for a first quantity of search results and a second quantity of clusters for a second quantity of search results, where the first quantity of clusters is greater than the second quantity of clusters and the first quantity of search results is greater than the second quantity of search results. In some possible implementations, cluster classification component 510 may create as many clusters as necessary to present the images.

In some example implementations, cluster classification component 510 may assign an equal quantity of images to each of the clusters. In some example implementations, cluster classification component 510 may assign at least a threshold quantity of images to each cluster, where the total quantity of images assigned to each cluster may differ. In some example implementations, there may be no condition on the quantity of images to assign to a cluster.

Layer selection component 520 may assign the images, of a cluster, to layers. For example, layer selection component 520 may assign an image to a layer based on a score of the image. In some example implementations, layer selection component 520 may select the image, with the highest score among the scores of the images in the cluster, as a representative image for the cluster. Layer selection component 520 may assign the representative image to the top layer—e.g., layer 1. Layer selection component 520 may select a set of images, with the highest scores among the scores of the images in the cluster, for the next layer—e.g., layer 2. Layer selection component 520 may repeat the selection of images, based on the scores, for subsequent layers.

The quantity of images in a child layer may be greater than the quantity of images in a parent layer, where the child layer, e.g., layer 2, is a layer immediately subsequent to the parent layer, e.g., layer 1. In some example implementations, the image selected for a parent layer may be included in a child layer. In some example implementations, the image selected for a parent layer may be excluded from a child layer.

In some implementations, the score for an image may be based on a measure of relevance of the image to a search query. Alternatively, or additionally, the score for an image may be based on a measure of quality of the image using, for example, one or more of the quality factors described above. Alternatively, or additionally, the score for an image may be based on characteristics of the image, such as a size of the image, an aspect ratio of the image, a sharpness of the image, or the like. In some implementations, the score for an image may be based on a combination of two or more of the above-mentioned factors or one or more other factors. In some implementations, the score for an image may be based on a weighted combination of two or more of the above-mentioned factors or one or more other factors.

Results presentation component 530 may generate scores for the clusters to which the images are assigned. In some possible implementations, results presentation component 530 may filter the images prior to generating the scores for the clusters. For example, results presentation component 530 may remove any images, which have a score below a threshold, from further consideration when determining the scores for the clusters. Alternatively, results presentation component 530 may select Z images (Z>1), with the highest scores, for consideration when determining the scores for the clusters.

There are several possible techniques that results presentation component 530 may use to score the clusters. For example, results presentation component 530 may generate a score for a particular cluster based on a quantity of the images that have been assigned to the particular cluster. If twenty images have been assigned to the particular cluster, the particular cluster may be assigned a score that is a function of twenty. Alternatively, or additionally, results presentation component 530 may generate a score for a particular cluster based on the score(s) of one or more of the images that have been assigned to the particular cluster. For example, if ten images have been assigned to the particular cluster, the particular cluster may be assigned a score that is a function of the score of the N highest-scoring images (N≥1), a function of the average score of the ten images or the M highest-scoring images (M>1), a function of the median score of the ten images or the M highest-scoring images, or some other function of the score(s) of one or more of the ten images. Alternatively, results presentation component 530 may use a combination of the above-identified techniques or another technique not specifically mentioned above to generate scores for the clusters.

Results presentation component 530 may generate a search result document. Results presentation component 530 may select clusters to include in the search result document. In some implementations, results presentation component 530 may select T of the clusters (T>1), such as the T clusters with the highest scores among the scores assigned to the clusters. In some implementations, results presentation component 530 may weight the scores assigned to the clusters and select T of the clusters based on the weighted scores, such as the T clusters with the highest weighted scores. In some implementations, results presentation component 530 may select all of the clusters associated with V of the images (V>1), such as V of the images with the highest scores among the scores assigned to the images. For example, results presentation component 530 may identify the clusters associated with the top one hundred image search results in the list of search results, and may select these clusters to include in the search result document.

Results presentation component 530 may also base the selection of the clusters on a type of client 210 used to transmit the search query. For example, results presentation component 530 may use a set of parameters, such as thresholds or quantities, for a client 210 that has a limited display screen size, such as a mobile telephone device, and another set of parameters, such as thresholds or quantities, for a client 210 that has no such limitations on display screen size, such as a personal computer. Rather than the type of client 210, information regarding an amount of bandwidth that is available to client 210 may be used.

Once results presentation component 530 has selected clusters to include in the search result document, results presentation component 530 may generate the search result document to include the selected clusters. For example, results presentation component 530 may sort the clusters based on the scores of the clusters and present images, of the clusters, based on the assigned layers. Results presentation component 530 may generate a search result document, such as a hypertext markup language ("HTML") document, and provide the search result document in response to the search query.

Figure 6:
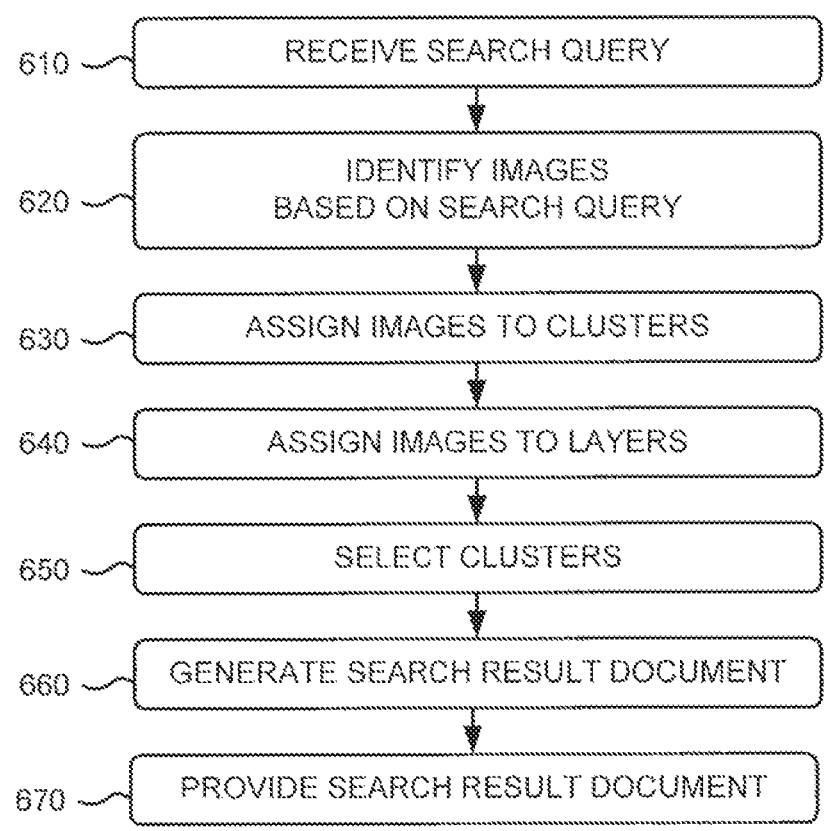
FIG. 6 is a flowchart of an example process for generating a search result document.

FIG. 6 is a flowchart of an example process 600 for generating a search result document. In some implementations, process 600 may be performed by server 220, such as by search system 225 of server 220. In some implementations, process 600 may be performed by one or more other devices instead of, or possibly in conjunction with, server 220. For example, some or all of process 600 may be performed by client 210 and/or server 230 or 240.

Process 600 may include receiving a search query (block 610). For example, a user of client 210 may use a browser, such as a web browser, to access a user interface of search system 225. Via the user interface, the user may enter a search query. Client 210 may transmit the search query to search system 225. Search system 225 may receive the search query from client 210.

Process 600 may include identifying images based on the search query (block 620). For example, as described above, search system 225 may perform a search of an index, such as index 410, to identify images, as search results that are relevant to the search query. Search system 225 may determine scores for the images and may rank the images based on their scores.

Process 600 may include assigning the images to clusters (block 630). For example, search system 225 may match images based on features of the images. As described above, the features may include, for example, color, shape, size, content, facial signatures, and/or metadata, such as labels or tags associated with the images. In some implementations, search system 225 may include an equal quantity of images in each of the clusters. In some implementations, search system 225 may include a different quantity of images in at least some of the clusters.

Process 600 may include assigning the images to layers (block 640). For example, search system 225 may identify one or more images, from each cluster, to include in each of the layers. Search system 225 may assign images to Y layers, where Y>1, such as Y≈3, 4, or 5. In some implementations, as described above, search system 225 may assign images to layers based on scores of the images. For example, search system 225 may assign the top-scoring A images of a cluster to a first, top, layer, where A≥1, such as A≈1, the top-scoring B images of the cluster to a second, next, layer, where B>A, such as B≈4, 9, or 16, the top-scoring C images of the cluster to a third, next, layer, where C>B, such as C≈16, 81, or 256, and so on.

In some implementations, the score for an image may be based on a measure of relevance of the image to the search query. Alternatively, or additionally, the score for an image may be based on a measure of quality of the image using, for example, one or more of the quality factors described above. Alternatively, or additionally, the score for an image may be based on characteristics of the image, such as a size of the image, an aspect ratio of the image, a sharpness of the image, or the like. In some implementations, the score for may be based on a combination of two or more of the above-mentioned factors and/or one or more other factors. In some implementations, the score for an image may be based on a weighted combination of two or more of the above-mentioned factors and/or one or more other factors.

Figure 7:
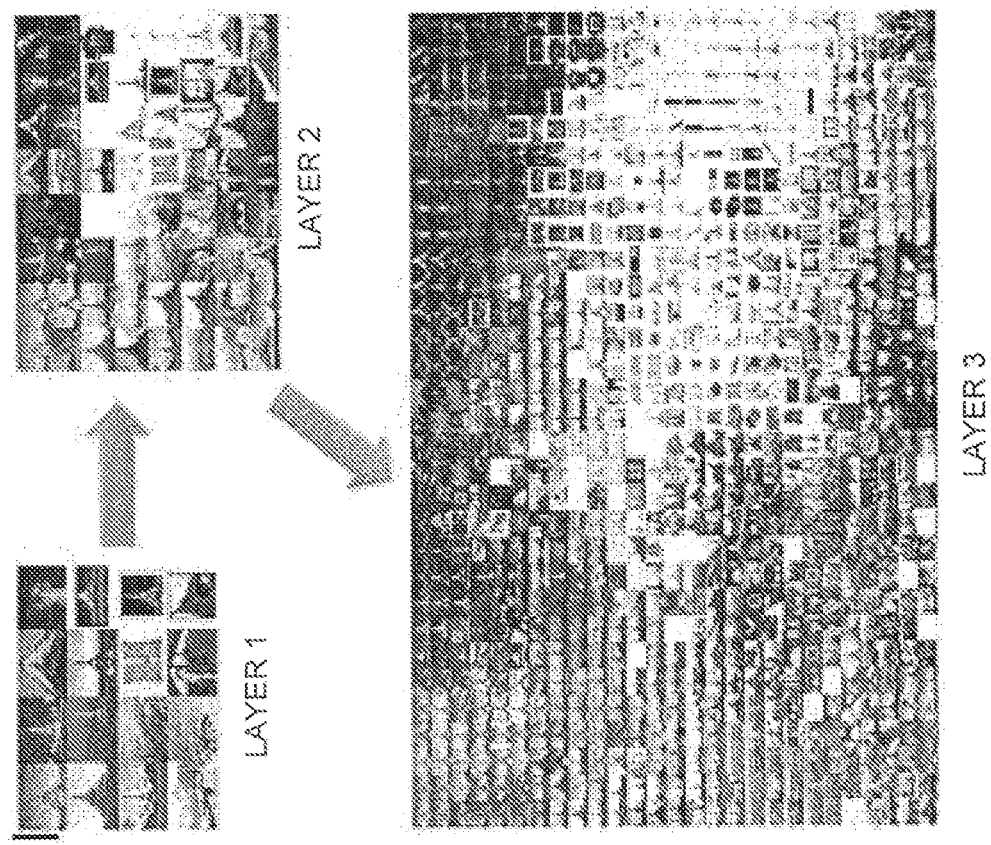
FIG. 7 is a diagram of example layers of images that may be generated.

FIG. 7 is a diagram of example layers of images that may be generated. Assume that 3 layers of images are generated. As shown in FIG. 7, the quantity of images in layer 2 may be greater than the quantity of images in layer 1, and the quantity of images in layer 3 may be greater than the quantity of images in layer 2. In the example shown in FIG. 7, layer 1 may include 16 images, layer 2 may include 64 images, and layer 3 may include 1,024 images. In this example, the images in layer 1 are included among the images in layers 2 and 3, and the images from layer 2 are included among the images in layer 3.

Figure 8:
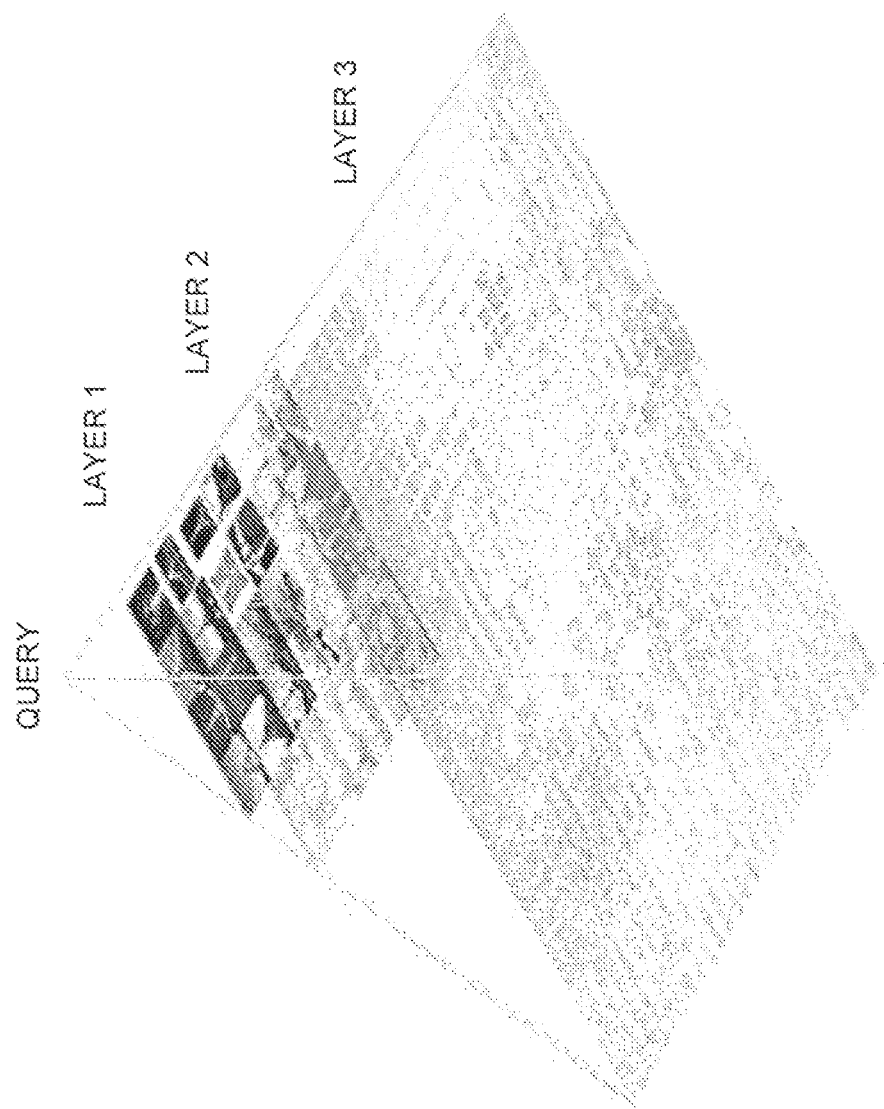
FIG. 8 is a diagram of an alternative view of the example layers of images.

FIG. 8 is a diagram of an alternative view of the example layers of images. The layers of images, shown in FIG. 8, are arranged in a pyramidal shape. As shown in FIG. 8, a query may be used to identify the images that are assigned to the layers. Similar to the example of FIG. 7, the quantity of images in layer 2 may be greater than the quantity of images in layer 1, and the quantity of images in layer 3 may be greater than the quantity of images in layer 2. Unlike the example of FIG. 7, in this example, the images in layer 1 are not included among the images in layers 2 and 3, and the images from layer 2 are not included among the images in layer 3.

Returning to FIG. 6, process 600 may include selecting clusters (block 650). For example, in some implementations, search system 225 may generate scores for the clusters using one or more of the techniques described above. Search system 225 may use the scores to select one or more of the clusters to include in a search result document, as described above. In some implementations, search system 225 may select clusters using something other than scores of the clusters, as also described above.

Process 600 may include generating a search result document (block 670), and providing the search result document (block 680). For example, search system 225 may generate a search result document that includes images from the selected clusters and assigned to one or more of the layers. Search system 225 may sort the clusters based on, for example, the scores of the clusters. Search system 225 may generate a search result document, such as a HTML document that includes images from the sorted clusters and based on the layers. Search system 225 may provide the search result document, to client 210, for presentation on a display of client 210, as a response to the search query.

While a series of blocks has been described with regard to FIG. 6, the order of the blocks may be modified in some implementations. Further, non-dependent blocks may be performed in parallel. Also, some blocks may be eliminated in some implementations. For example, the images need not be associated with search results. In other words, a set of images, in a repository, may be identified and assigned to clusters and layers. In this case, block 610 may be eliminated, block 620 may be modified to simply identify images—independent of any search query, and blocks 660 and 670 may be modified to generate and present an arrangement of images in a user interface. Thus, at least some of the blocks may be performed offline—prior to any interaction with a user or client 210.

Figure 9:
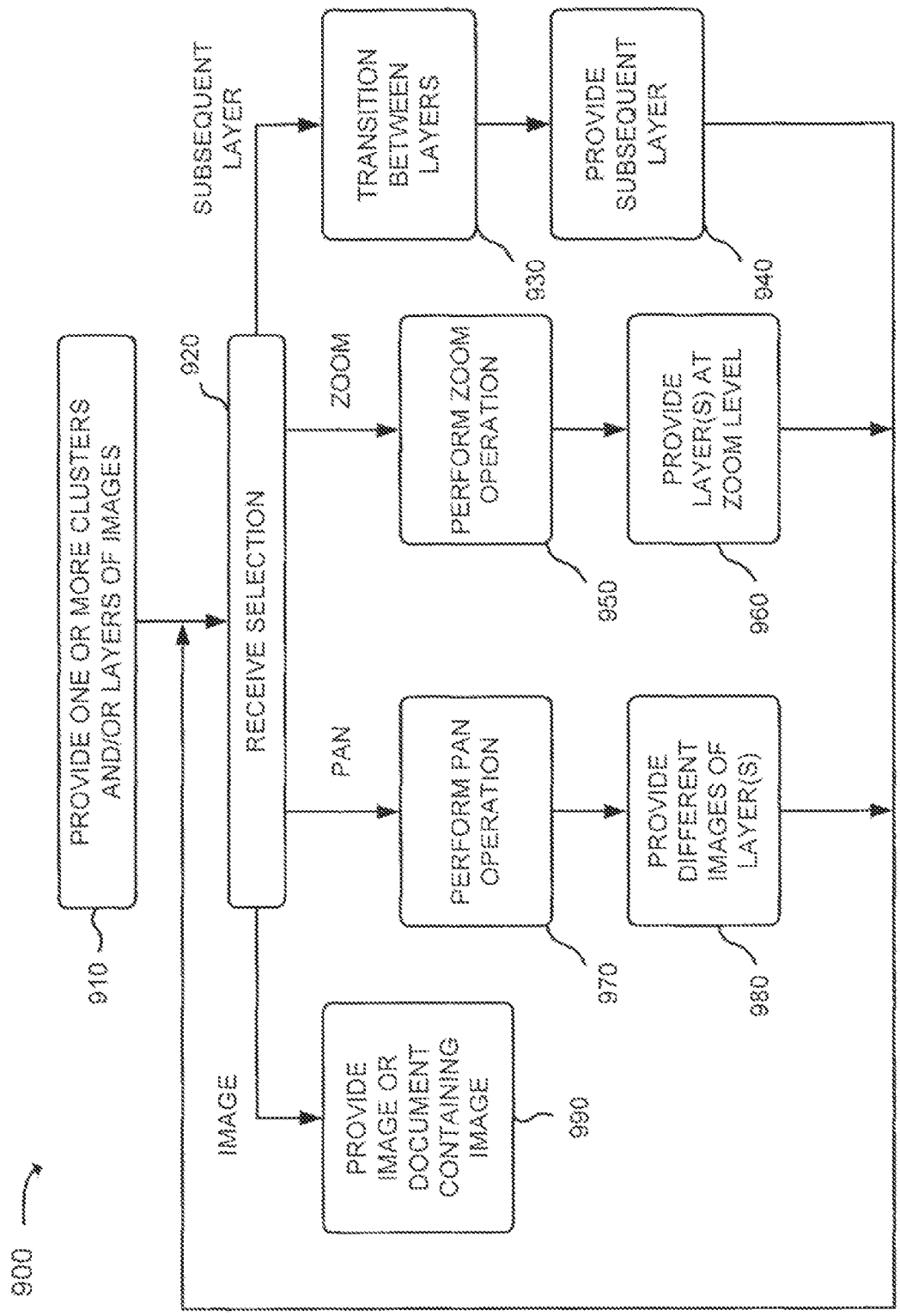
FIG. 9 is a flowchart of an example process for browsing clusters and layers of images.

FIG. 9 is a flowchart of an example process 900 for browsing clusters and layers of images. In some implementations, process 900 may be performed by server 220, such as by search system 225 of server 220. In other implementations, process 900 may be performed by client 210. In yet other implementations, some or all of process 900 may be performed by a combination of server 220 and client 210. In further implementations, some or all of process 900 may be performed by one or more devices separate from, or including, server 220 and/or client 210, such as server 230 or 240.

Process 900 may include providing one or more clusters and/or layers of images (block 910). For example, search system 225 may provide, to client 210, a set of images that may be arranged in clusters and/or layers, as described above. Alternatively, or additionally, client 210 may provide a set of images that may be arranged in clusters and/or layers, as described above, for presentation on a display associated with client 210.

Figure 10:
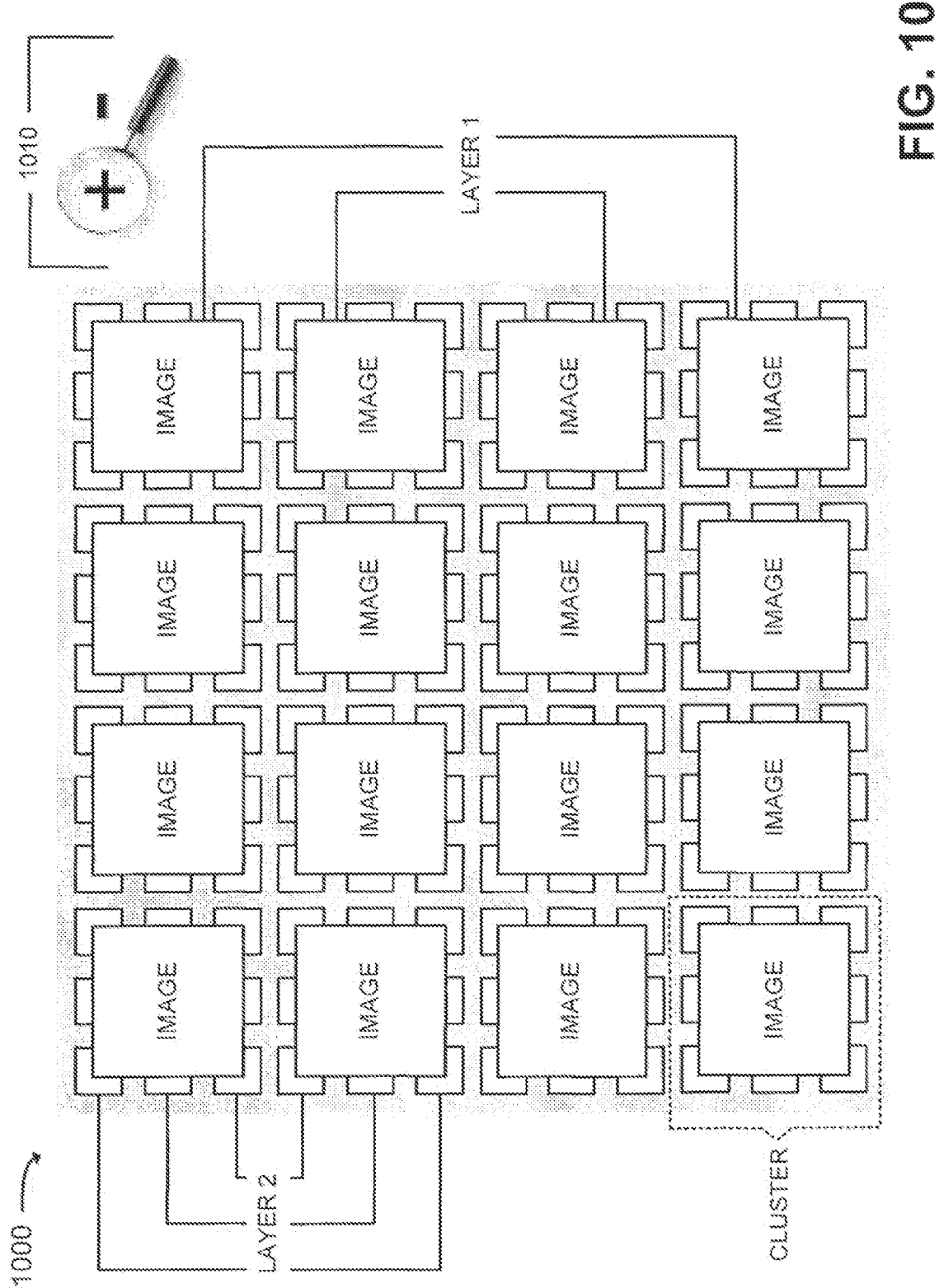
FIG. 10 is a diagram of an example user interface that includes a set of images.

FIG. 10 is a diagram of an example user interface 1000 that includes a set of images. As shown in FIG. 10, assume that user interface 1000 includes a set of 16 clusters. In some example implementations, each of the clusters may include a representative image associated with a first layer—shown as "layer 1"—and a set of images associated with a second layer—shown as "layer 2." The size of the representative image, in a cluster, may be larger than the size of each image in the set of images. For example, the size of the representative image, in the cluster, may be D times larger than the size of the images in the set of images, where $D \geq 2$, such as $D \approx 2, 3, 4$.

As shown in FIG. 10, the representative image may be presented on top of the set of images associated with the second layer. In some implementations, the representative image may partially or wholly cover each of the images associated with the second layer. In some implementations, the representative image may partially or wholly cover some, but not all, of the images associated with the second layer. In this presentation, it may be beneficial to load fewer than all of the images associated with the second layer.

User interface 1000 may be configured with minimal space between images in a cluster and between images of different clusters. This minimal space may be designed to permit selection of the space between the images and/or clusters. Selection of the space may cause images of the second layer to be presented.

User interface 1000 may provide options that permit a user to browse the images. For example, as shown in FIG. 10, user interface 1000 may include options 1010 that permit a user to zoom in ("+") and zoom out ("−") on the images. Selection of the zoom in option may cause larger versions of the images to be presented than presented within user interface 1000 prior to selection of the zoom in option. Selection of the zoom in option may also cause a smaller quantity of images to be presented than presented within user interface 1000 prior to selection of the zoom in option. Selection of the zoom out option may cause smaller versions of the images to be presented than presented within user interface 1000 prior to selection of the zoom out option. Selection of the zoom out option may also cause a greater quantity of images to be presented than presented within user interface 1000 prior to selection of the zoom out option.

Alternatively, or additionally, user interface 1000 may permit a user to pan up, down, left, and/or right with regard to the images presented within user interface 1000. For example, the user may pan in different directions to obtain additional clusters of images.

Alternatively, or additionally, user interface 1000 may permit a user to select a particular image to obtain additional information regarding the particular image. For example, the user may select one of the representative images by clicking on the image using a selection device or finger, by hovering over the image for a particular amount of time, e.g., 2 seconds, using a cursor or finger, or by using another technique. Selection of a representative image may cause a larger version of the representative image to be presented, or a document, containing the representative image, to be presented.

Alternatively, or additionally, user interface 1000 may permit a user to cause the images, associated with the second layer, to be presented in front of the representative images associated with the first layer. For example, the user may select an image associated with the second layer or the space between images within a cluster or between clusters to cause the images, associated with the second layer, to be presented on top of the images associated with the first layer. Alternatively, the user may select an image associated with the second layer or the space between images within a cluster or between clusters to cause the images, associated with the second layer, to replace the representative image, and to reveal images associated with a third layer.

Returning to FIG. 9, process 900 may include receiving a selection (block 920). For example, as briefly described above with regard to FIG. 10, a user may be presented with options for selecting a subsequent layer of images, selecting to zoom in or out, selecting to pan in a particular direction, or selecting a particular image. Search system 225 may receive information, regarding the selection, from client 210. Alternatively, or additionally, client 210 may receive the selection from the user of client 210.

If selection of a subsequent layer of images occurs (block 920—SUBSEQUENT LAYER), process 900 may include transitioning between layers (block 930) and providing a subsequent layer (block 940). For example, search system 225, or client 210, may cause a transition to occur where the images, associated with the second layer, replace the images associated with the first layer. This transition may occur in many different ways. For example, visual effects may be used, such as appear, fly, blinds, box, checkerboard, crawl, dissolve, flash, peek, bars, spiral, split, stretch, strips, swivel, wipe, zoom, expand, fade, ascend, descend, boomerang, bounce, flip, float, pinwheel, whip, etc. In some implementations, the visual effect used for one cluster may be the same for all clusters. In some implementations, the visual effect used for one cluster may differ from a visual effect used for at least one other cluster.

Figure 11B:
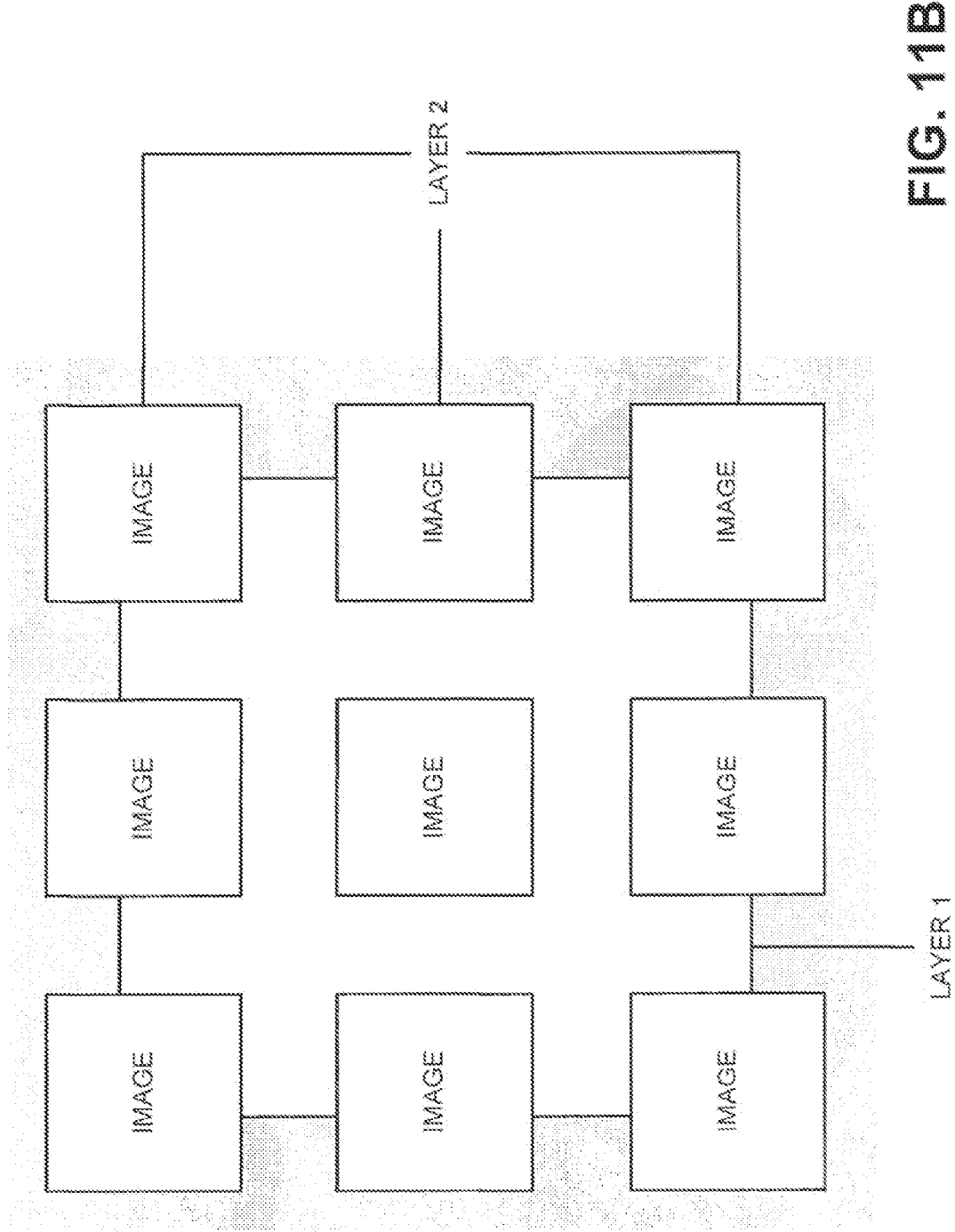

FIGS. 11A and 11B are diagrams illustrating an example of transitioning from one layer of images to another layer of images. In the example illustrated in FIGS. 11A and 11B, a transition involving a single cluster of images is presented. As shown in FIG. 11A, a representative image, associated with the first layer, may be presented on top of images associated with the second layer. The transition may cause the images associated with the second layer to replace the representative image associated with the first layer. As shown in FIG. 11B, the images of the second layer may be presented on top of the representative image to wholly or partially cover the representative image associated with the first layer.

Figure 12A:
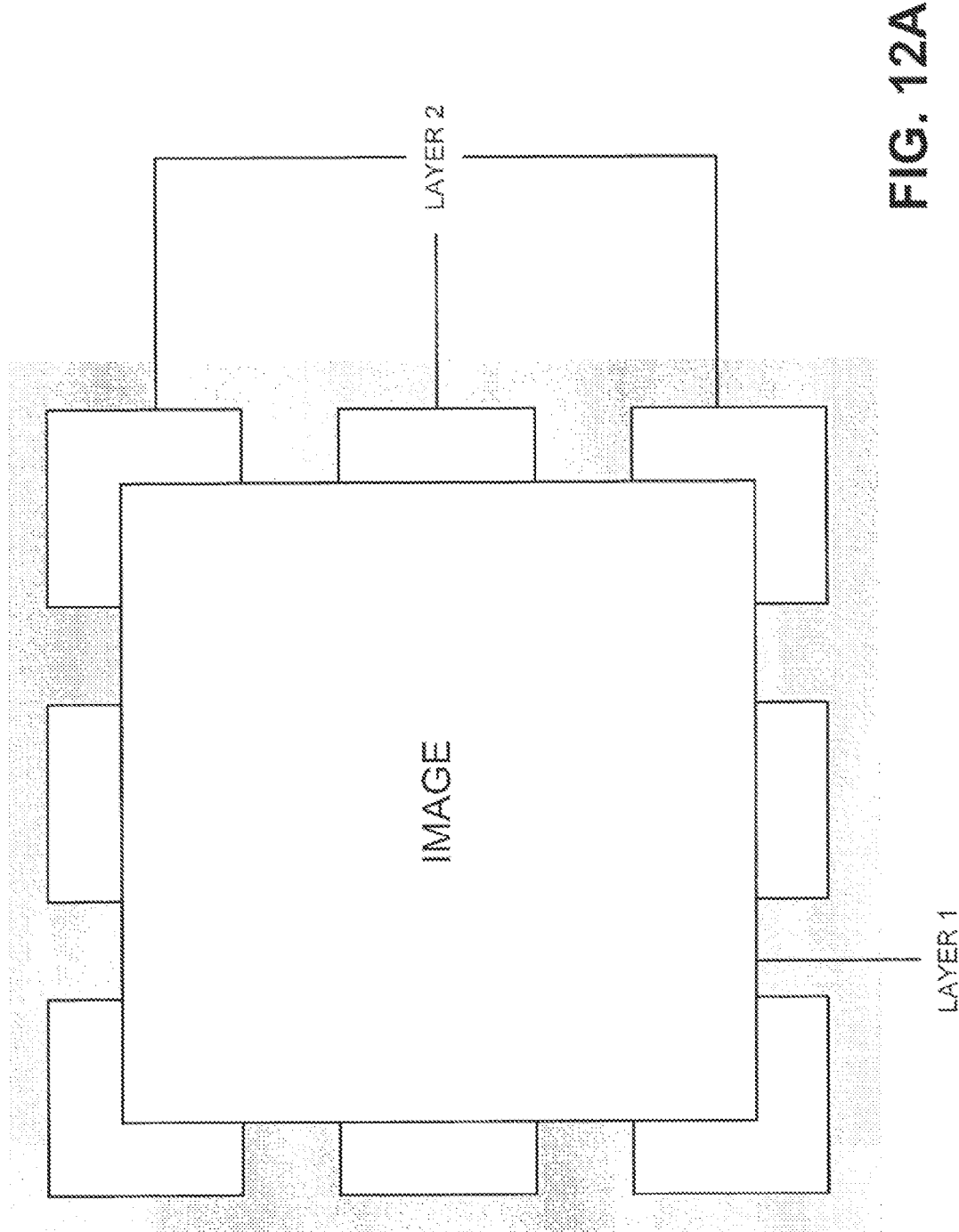

FIGS. 12A and 12B are diagrams illustrating another example of transitioning from one layer of images to another layer of images. In the example illustrated in FIGS. 12A and 12B, a transition involving a single cluster of images is presented. As shown in FIG. 12A, a representative image, associated with the first layer, may be presented on top of images associated with the second layer. The transition may cause the images associated with the second layer to replace the representative image associated with the first layer, and images, associated with a third layer, to be revealed. As shown in FIG. 12B, the images, associated with the second layer, may be presented on top of images associated with a third layer. The images, associated with the second layer, may wholly or partially cover the images associated with the third layer.

Returning to FIG. 9, if selection of a zoom operation occurs (block 920—ZOOM), process 900 may include performing a zoom operation (block 950) and providing layer(s) of images at a zoom level (block 960). For example, search system 225, or client 210, may present larger versions of the images and/or a smaller quantity of images in response to receiving a zoom in instruction. Similarly, search system 225, or client 210, may present smaller versions of the images and/or a larger quantity of the images in response to receiving a zoom out instruction.

Figure 13A:
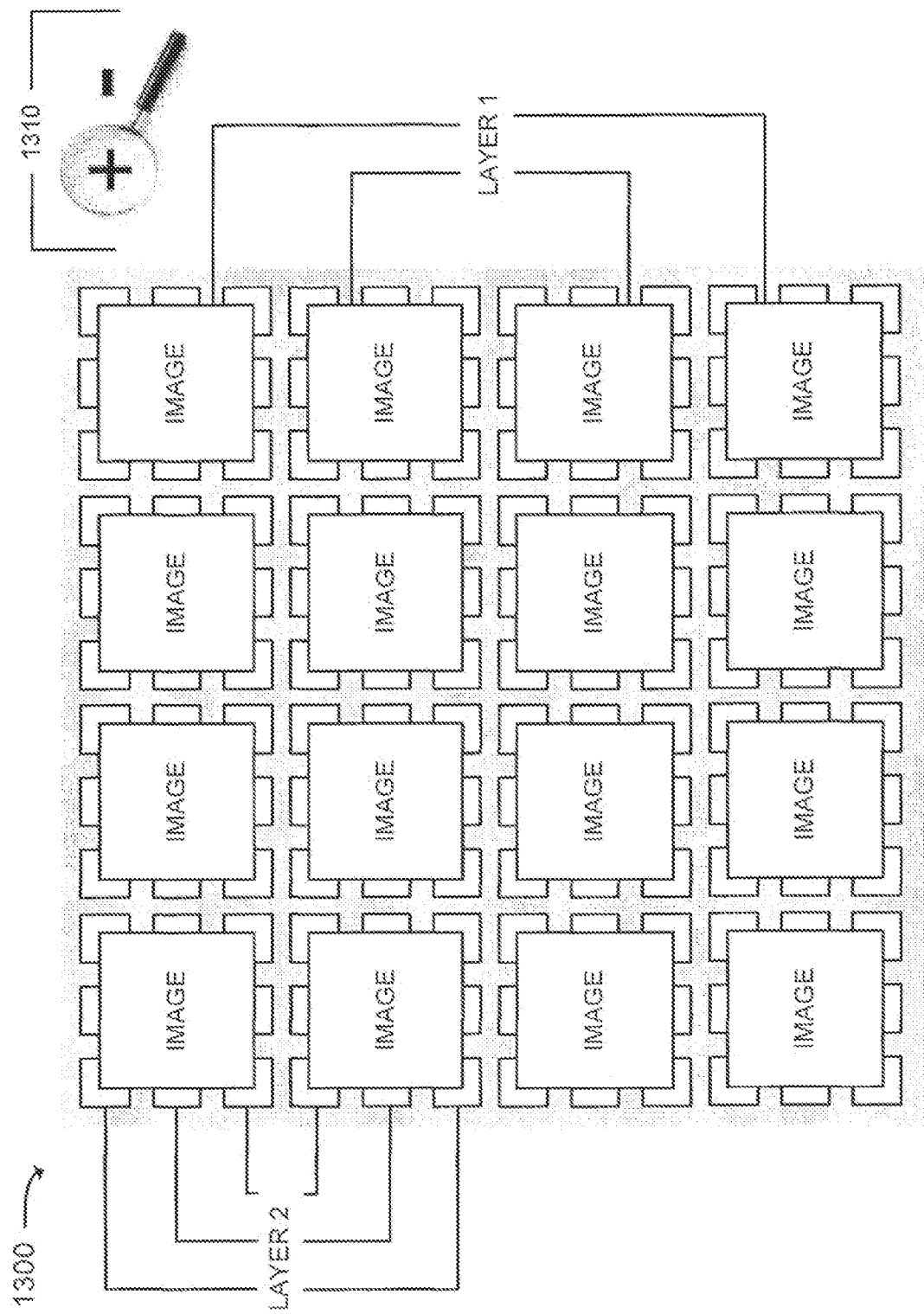

FIGS. 13A-13C are diagrams illustrating potential zoom operations that may be performed. As shown in FIG. 13A, assume that a set of 16 clusters are presented along with an option 1310 for zooming in or out. Each cluster may include a representative image associated with a first layer, and a set of 9 images associated with a second layer.

Assume that the user provides an instruction to zoom in by selecting a zoom in portion of option 1310. As shown in FIG. 13B, the size of the images, of both the first layer and the second layer, may be enlarged and/or a smaller quantity of clusters may be presented. For example, as shown in FIG. 13B, the sizes of all images have increased and the quantity of clusters has decreased from 16 clusters to 9 clusters.

Now assume that rather than providing an instruction to zoom in, the user provides an instruction to zoom out by selecting a zoom out portion of option 1310 in FIG. 13A. As shown in FIG. 13C, the size of the images, of both the first layer and the second layer, may be reduced and/or a greater quantity of clusters may be presented. For example, as shown in FIG. 13C, the sizes of all images have decreased and the quantity of clusters has increased from 16 clusters to 36 clusters.

Returning to FIG. 9, if selection of a pan operation occurs (block 920—PAN), process 900 may include performing a pan operation (block 970) and providing different images of the layer(s) (block 980). For example, search system 225, or client 210, may present additional images, which were not previously shown, in response to receiving a pan instruction. In some implementations, a single column or row of clusters may be replaced by an additional column or row of clusters in response to receiving a single pan instruction. In some implementations, multiple columns or rows of clusters may be replaced by an equal quantity of additional columns or rows of clusters in response to a single pan instruction.

If selection of an image occurs (block 920—IMAGE), process 900 may include providing the image or a document that includes that image (block 990). For example, the user may select an image by clicking on the image using a selection device or finger, by hovering over the image for a particular amount of time using a cursor or a finger, or by using another selection technique. In response to receiving selection of the image, search system 225 may present the image, in its actual size or in a size larger than its actual size, to client 210. Alternatively, in response to receiving selection of the image, search system 225 may cause a document, such as a web page, that includes the image, to be presented to client 210. For example, search system 225 may redirect client 210 to the document.

While a series of blocks has been described with regard to FIG. 9, the order of the blocks may be modified in some implementations. Further, non-dependent blocks may be performed in parallel. Also, some blocks may be eliminated in some implementations. For example, in some implementations, zoom and/or pan operations may not be permitted.

The above-identified presentation techniques and browsing options may give users a favorable user experience by assisting the users in locating images in which the users are interested.

The foregoing description provides illustration and description, but is not intended to be exhaustive or to limit the implementations to the precise form disclosed. Modifications and variations are possible in light of the above disclosure or may be acquired from practice of the implementations.

Also, example user interfaces have been described with respect to FIGS. 10, 11A, 11B, 12A, 12B, and 13A-13C. In some implementations, the user interfaces may include additional items of information, fewer items of information, different items of information, or differently arranged items of information.

Further, certain operations have been described in response to selections of certain options in a user interface. In some implementations, these operations may be performed in response to other input, such as a mouse scroll or click, a manipulation of a user's finger or fingers, or the like.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a device, a search query;
    identifying, by the device and based on the search query, images;
    assigning, by the device and based on one or more features associated with each image of the identified images, the identified images to a respective cluster of a plurality of clusters;
    for each cluster, assigning, by the device, the images associated with the cluster to a respective layer of a plurality of layers based at least in part on an image score determined for the assigned images;

determining, by the device, a cluster score for each cluster of the plurality of clusters, the cluster score being determined based at least in part on an image quality associated with one or more images associated with the cluster;

selecting, by the device, a subset of clusters of the plurality of clusters based at least in part on the determined cluster scores;

generating, by the device, a document that includes information regarding the subset of selected clusters, the document including a first image, corresponding to one of the identified images assigned to a first layer of the plurality of layers, and a plurality of second images corresponding to multiple ones of the identified images assigned to a second layer of the plurality of layers, and at least one of the plurality of second images being at least partially covered by the first image; and providing, by the device and for presentation, the document.

2. The method of claim 1, where a size of the first image is greater than a size of each of the plurality of second images.

3. The method of claim 1, where the at least one of the plurality of second images is at least partially visible when the document is rendered for display.

4. The method of claim 1, further comprising:
using information associated with the plurality of clusters and information associated with the identified images to determine the respective layer for each image of the identified images.

5. The method of claim 1, where, when assigning the identified images to the respective cluster, the method includes:
identifying a feature associated with each image of the identified images, the feature identifies at least one of:
color information,
shape information,
size information,
content information,
facial signature information,
label information, or
tag information; and
using the identified feature to assign the identified images to the respective cluster.

6. The method of claim 4, further comprising:
determining, based on a quantity of images included in the identified images, a quantity of the plurality of clusters,
where, when assigning the identified images to the respective cluster, the method includes:
assigning the identified images to the determined quantity of the plurality of clusters.

7. The method of claim 1, further comprising:
determining a score for each of the identified images,
where, when assigning the identified images to the respective layer, the method includes:
assigning the identified images to the respective layer based on the determined score for each of the identified images.

8. A device comprising:
a memory to store instructions; and
a processor to execute the instructions to:
receive, from a client device, a search query;
identify, based on the search query, images;
assign, based on one or more features associated with each image of the identified images, the identified images to a respective cluster of a plurality of clusters;

for each cluster, assign the images associated with the cluster to a respective layer of a plurality of layers based at least in part on an image score determined for the assigned images;

determine a cluster score associated with each cluster of the plurality of clusters, the cluster score being determined based at least in part on an image quality associated with one or more images associated with the cluster;

select a subset of clusters of the plurality of clusters based at least in part on the determined cluster scores;

generate a document that includes information regarding the subset of selected clusters, the document including a first image, corresponding to one of the identified images assigned to a first layer of the plurality of layers, and a plurality of second images corresponding to multiple ones of the identified images assigned to a second layer of the plurality of layers;

receive information associated with characteristics of the client device;

determine, based on the received information, display parameters associated with the document; and provide, for presentation and using the determined display parameters, the document.

9. The device of claim 8, where the processor is further to:
receive a selection of an image of the identified images; and
provide, for presentation and based on the received selection, information associated with the image.

10. The device of claim 8, where the information associated with the image is another document, the other document being different than the document.

11. The device of claim 8, where the processor is further to:
receive a selection of an image of the identified images; and
provide, for presentation and based on the received selection, a larger version of the image.

12. The device of claim 8, where the processor is further to:
receive selection of an option associated with the document; and
perform, based on the received selection, a zoom operation on the document, the zoom operation resulting in a modification to a quantity of the information regarding the identified images.

13. The device of claim 8, where the processor is further to:
use information associated with the plurality of clusters and information associated with the identified images to determine the respective layer for each image of the identified images.

14. The device of claim 8, where the processor is further to:
determine a score for each of the identified images,
where the processor, when assigning the identified images to the respective layer, is further to:
assign the identified images to the respective layer based on the determined score for each of the identified images.

15. A non-transitory computer-readable medium storing instructions, the instructions comprising:
one or more instructions which, when executed by a processor, cause the processor to:
identify, based on a search query, images;

assign, based on one or more features associated with each image of the identified images, the identified images to a respective cluster of a plurality of clusters;

for each cluster, assign the images associated with the cluster to a respective layer of a plurality of layers based at least in part on an image score determined for the assigned images;

determine a cluster score for each cluster of the plurality of clusters, the cluster score being determined based at least in part on an image quality associated with one or more images associated with the cluster;

select a subset of clusters of the plurality of clusters based at least in part on the determined cluster scores generate a document that includes information regarding the subset of selected clusters, the document including a first image, corresponding to one of the identified images assigned to a first layer of the plurality of layers, and a plurality of second images corresponding to multiple ones of the identified images assigned to a second layer of the plurality of layers;

access display parameters associated with the document; and provide, for presentation and using the accessed display parameters, the document.

16. The computer-readable medium of claim 15, where the instructions further include:
one or more instructions to determine, based on a quantity of images included in the identified images, a quantity of the plurality of clusters; and
one or more instructions to use information associated with the plurality of clusters and information associated with the identified images to determine the respective layer for each image of the identified images.

17. The computer-readable medium of claim 15, where the at least one of the plurality of second images is at least partially visible when the document is rendered for display.

18. The computer-readable medium of claim 15, where the instructions further include:
one or more instructions to receive a selection of an image of the identified images; and
one or more instructions to provide, for presentation and based on the received selection, information associated with the image.

19. The computer-readable medium of claim 15, where the instructions further include:
one or more instructions to receive a selection of an image of the identified images; and
one or more instructions to provide, for presentation and based on the received selection, a modified version of the image.

20. The computer-readable medium of claim 15, where the instructions further include:
one or more instructions to receive selection of an option associated with the document; and
one or more instructions to perform, based on the received selection, a zoom operation on the document, the zoom operation resulting in a modification to a quantity of the information regarding the identified images.

* * * * *